UNITED STATES PATENT OFFICE.

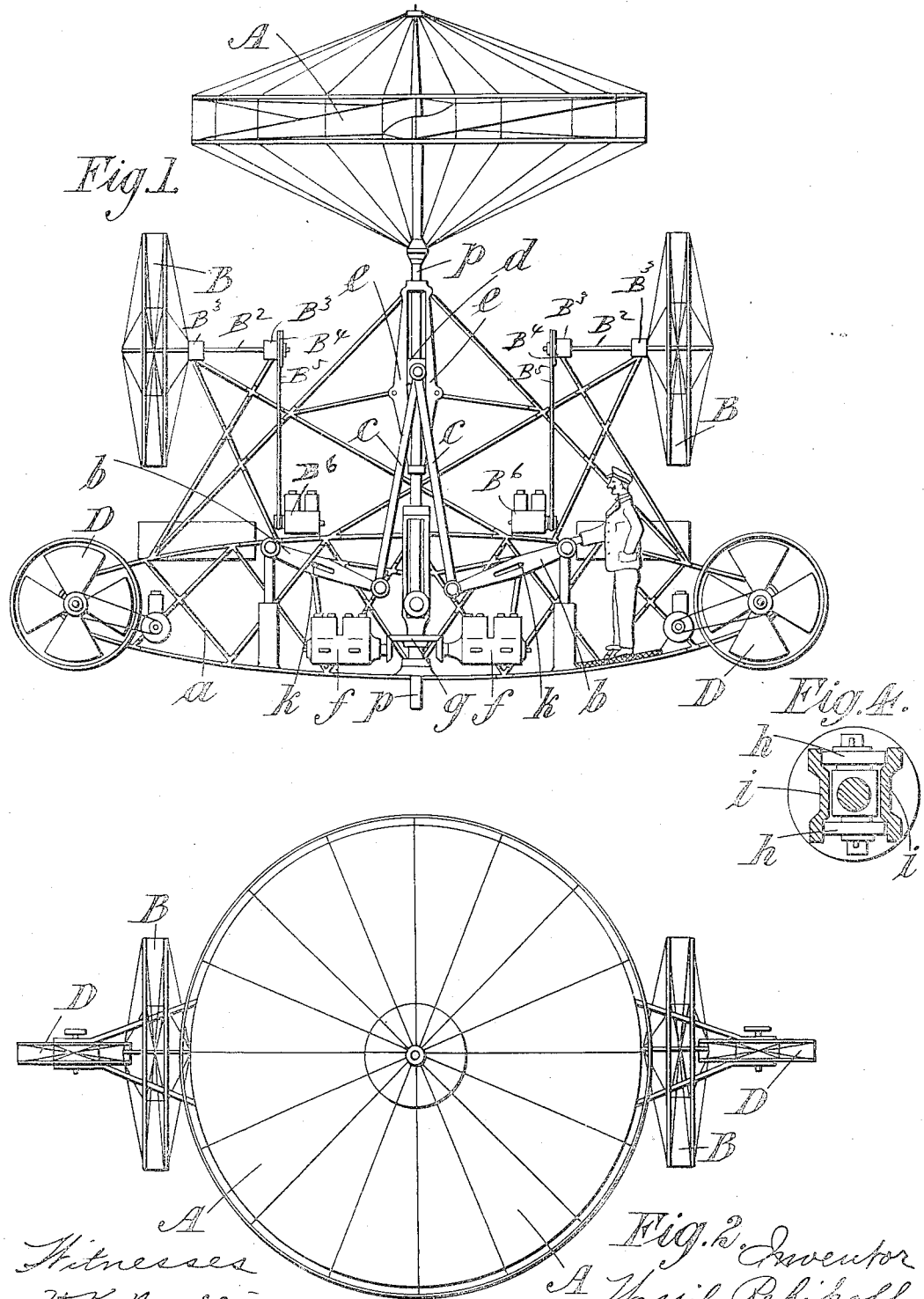

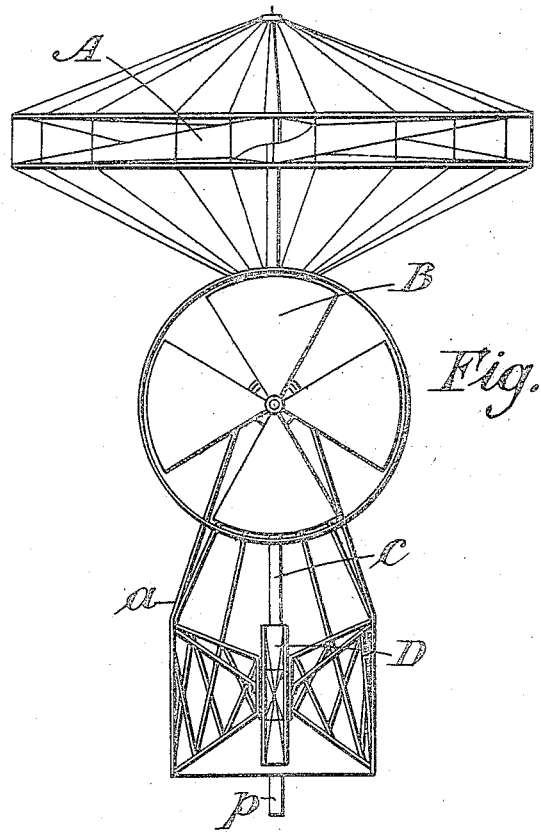

WASSILY REBIKOFF, OF ST. PETERSBURG, RUSSIA.

FLYING-MACHINE.

999,337.  Specification of Letters Patent.  Patented Aug. 1, 1911.

Application filed March 9, 1907. Serial No. 361,525.

*To all whom it may concern:*

Be it known that I, WASSILY REBIKOFF, a subject of the Czar of Russia, residing at St. Petersburg, Russia, have invented certain new and useful Improvements in Flying-Machines, of which the following is a specification.

This invention relates to improvements in flying machines of that kind in which a horizontal plane is employed as the sustaining member.

When a plane moves in the air in a direction perpendicular or approximately perpendicular to its surface, and at a uniform speed the air offers a certain resistance but if the plane is given a sudden abrupt movement, a sudden jerk, it produces a shock on the air and the resistance given by the air is greatly increased, as much as seven to twenty five times greater, as I have proved by experiments. If such a quick vibratory movement is communicated to a plane, each side of the said plane will meet a resistance to the movement, corresponding to the speed of the latter. If it were desired to utilize such a vibratory movement of a horizontal plane in order to raise it in the air, the periods of the descending movements would give the useful pressures (the support) and the periods of the ascending movements, the injurious pressures. Thus if it is desired to utilize a vibrating plane for aerial locomotion it is necessary to find means for eliminating the injurious resistance during the periods of the ascending movements of the plane, allowing the plane to be subjected to pressure only from below. In studying this subject I have found that to obtain a successful result it is necessary to employ an abrupt downward motion of the plane in combination with means for providing a cushion of air or compressed air under the plane in order to neutralize or minimize the injurious effects of the air resistance above the plane, on its rising movements.

My invention therefore consists in applying to a plane or planes for the purpose of raising and sustaining a flying machine the great resistance which the air offers to a plane which suddenly and abruptly strikes the air. This resistance gives to the plane a support which allows the body of the machine to be raised by the plane or planes.

In carrying out this invention I impart to the plane or planes, vertical vibratory or reciprocating movements with sudden and abrupt downward strokes, and at the same time I produce a horizontal current of air forced under the plane or planes which current eliminates the injurious effect of the air resistance to the up-stroke, giving at all times a pressure on the under surface of the plane or planes. For propelling the flying machine I employ the usual propellers or I may in suitable conditions give more force to the propellers used for producing the horizontal current of air. For giving the sudden or abrupt downward motion to the plane or planes I preferably employ an explosion motor without fly wheel or crank, or I may use springs, or compressed air. This system of aerial locomotion consists therefore in the simultaneous combination of two movements; vibratory and rotatory. In some cases, the plane at the same time can act as an orthopter and as a helicopter, in others as an orthopter and an aeroplane. In the case of the combination of vibratory and rotatory movements in the same parts, the plane receives the shape of a screw propeller with several more or less wide blades. The number of blades depends on the speed of rotation, the amplitude of the vibratory movement and the speed of the ascending movement of the vibrating plane. The size of the blades and their area depends on the speed of the descending movement of the vibrating plane, on the size of the weight to be raised and on the degree of tension of the material of the plane and of the bars which support it and fix it to the spindle.

The working of my system is, therefore, as follows:—During the first or downward stage of the vibratory movement, the helical rotating plane quickly descends, and striking the air, finds in the latter a support and raises the whole structure. During the second or upward stage of the movement, the helical plane screws in the air, and, resting on the latter, rises, and at the same time raises its spindle and the parts of the engine connected to the latter. When the bottom portion of the spindle assumes the highest position relatively to the other portions of the engine, the plane quickly descends, again striking the air, and so on.

Experiments and calculations have proved that the speed of the ascending movement must be less than the speed of the descending movement, for during the time of the ascension of the plane, the frame continues to rise by momentum, gradually decreasing its speed.

The calculation of a flying machine of the "orthohelicopter" type, capable of raising six tons has proved that it is possible to make it of a weight of four tons, that is to say, to give it a reserve of 33% of raising power, notwithstanding that the safety co-efficients were exaggerated, and the number of machines and helical planes doubled.

The force of the air current impinging on the under surface of the plane may be slight, seeing that the plane can be counterbalanced by springs having a tendency to increase the distance between the plane and the body of the machine.

In the accompanying drawing Figure 1 shows in side view a flying apparatus diagrammatically, which is constructed according to a system of uniting rotative and vibrative movement (orthohelicopter). Fig. 2 is a plan view: Fig. 3 an end view, and Fig. 4 a detail.

The apparatus comprises a light structure $a$, preferably built on the diagonal-stay system of thin-walled steel pipes and forming the shell of the apparatus. To give the vibrative movements gasolene motors without fly wheels or cranks are placed within said structure. The piston rods of the motors are connected, by means of swinging levers $b$ and rods $c$, with a roller abutment bearing of the axle $p$ of the screw or "helicopterous" surface A. This bearing is placed inside a cross-head $d$ arranged to slide along vertical guides $e$ firmly fastened to the shell of the apparatus.

The rotation of the axle is performed by means of motors $f$ actuating wheel $g$, along the bushing of which the axle of the screw surface may slide, up and down. To decrease the friction, the rotative force is transmitted through the medium of rollers $h$ (Fig. 4) and abutment strips $i$ instead of a key, the first being fastened to the axle and the second to pulley $g$.

The fulcrum $k$ of the swinging levers $b$ may be adjustable to enable the amplitude of the movements of the screw-surface to be varied.

The progressive movement of the apparatus may be produced either by ordinary screws B carried on horizontal axles $B^2$ supported in bearings $B^3$ and driven by pulleys $B^4$ and belts $B^5$ from motors $B^6$, or by inclining the axis of the vibrating screw surface.

To do away with the tendency of the whole apparatus to revolve around the vertical axis, resulting from the resistance of the air to the rotation of a screw vibrating surface, a screw D is located at each end of the shell, of which screws the axes of rotation are at right angles to the longitudinal axis of the apparatus. These same screws may fulfil the function of rudders.

For greater safety, the orthohelicopters may be furnished with two vibrating surfaces, which may have a common axis of rotation by using tubular axes one within the other revolving in opposite directions.

For decreasing the work for rotating vibratory screws of the orthohelicopter as well as the speed and pressure of the horizontal current of air required for raising the inclined planes of the orthoaeroplane the screws as well as the planes may be balanced to a certain degree by the aid of springs tending to raise the screw or the plane. Thus the work of the motor imparting downward vibration increases when the screw or plane descends as it has to stretch the spring equalizing the screw or plane but owing to this the work of the motor or motors rotating the blades in a helicopter or producing the horizontal current of air with an aeroplane decreases. This renders it possible to decrease the number of revolutions of the screws or their speed and to increase the co-efficient of the work of the motors giving downward motion and to afford a possibility of the orthoaeroplane to rise almost vertically against the wind, as the slightest wind will raise the plane.

What I claim as my invention, and desire to secure by Letters Patent is:—

1. In a flying machine the combination with a frame, of a substantially horizontal supporting member capable of up and down motion, mechanism to impart abrupt downward motions to said member, mechanism for rotating said supporting member and producing a horizontal current of air beneath the same, substantially as set forth.

2. In a flying machine the combination with a frame, of substantially horizontal vibratory members, mechanism to impart abrupt downward motions to said members, mechanism for rotating said vibratory members and producing a horizontal current of air beneath the same, substantially as set forth.

3. In a flying machine the combination with a frame, of a substantially horizontal supporting member, capable of up and down motion, mechanism to impart abrupt downward motions to said member, mechanism for rotating said supporting member, and screw propellers to produce a horizontal current of air beneath said supporting member, substantially as set forth.

4. In a flying machine the combination with a frame, of substantially horizontal vibratory members, mechanism to impart abrupt downward motions to said members, mechanism for rotating said vibratory members, and screw propellers to produce a horizontal current of air beneath said vibratory members substantially as set forth.

5. In a flying machine the combination with a frame, of a substantially vertical shaft, a horizontal supporting member rotatably mounted and longitudinally movable on said shaft, motor mechanism for rotating said shaft, motor mechanism for imparting abrupt downward motions to said member, and vertical propellers arranged beneath the horizontal member, substantially as set forth.

6. In a flying machine the combination with a frame, of a substantially vertical shaft, a horizontal supporting member rotatably mounted and longitudinally movable on said shaft, motor mechanism for rotating said shaft, motor mechanism for imparting abrupt downward motions to said supporting member, and vertical propellers mounted on the frame at right angles to the aforesaid members, substantially as set forth.

In testimony whereof I have signed my name to this specification in the presence of two subscribing witnesses.

WASSILY REBIKOFF.

Witnesses:
 HERNANDO DE SOTO,
 JACK H. BAKER.